(12) United States Patent
Aymeloglu et al.

(10) Patent No.: US 8,484,115 B2
(45) Date of Patent: Jul. 9, 2013

(54) OBJECT-ORIENTED TIME SERIES GENERATOR

(75) Inventors: Andrew Aymeloglu, Palo Alto, CA (US); Kevin Simler, Fremont, CA (US); Garry Tan, Mountain View, CA (US); Derek Cicerone, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 1168 days.

(21) Appl. No.: 11/866,859

(22) Filed: Oct. 3, 2007

(65) Prior Publication Data
US 2009/0094166 A1    Apr. 9, 2009

(51) Int. Cl.
*G06Q 40/00*    (2006.01)
*G06Q 40/06*    (2012.01)

(52) U.S. Cl.
CPC ............... *G06Q 40/00* (2013.01); *G06Q 40/06* (2013.01)
USPC ......................................... 705/36 R; 705/35

(58) Field of Classification Search
CPC ............................... G06Q 40/00; G06Q 40/06
USPC ......................................... 705/36, 35, 36 R
See application file for complete search history.

(56) References Cited

U.S. PATENT DOCUMENTS

| | | | |
|---|---|---|---|
| 5,414,838 A | 5/1995 | Kolton et al. | |
| 6,532,449 B1 * | 3/2003 | Goertzel et al. | 705/36 R |
| 7,356,504 B2 * | 4/2008 | Muller | 705/38 |
| 7,630,931 B1 * | 12/2009 | Rachev et al. | 705/36 R |
| 7,657,478 B2 * | 2/2010 | De Diego Arozamena et al. | 705/36 R |
| 2002/0156812 A1 | 10/2002 | Krasnoiarov et al. | |
| 2003/0187761 A1 * | 10/2003 | Olsen et al. | 705/35 |
| 2010/0057600 A1 * | 3/2010 | Johansen et al. | 705/37 |

OTHER PUBLICATIONS

Patrick, A. T., & Steve, A. J. (1999). Forecastable default risk premia and innovations. Journal of Economics and Finance, 23(3), 214-225. Retrieved Mar. 7, 2013.*
International Searching Authority, "International Search Report", PCT/US2008/077528, dated Dec. 4, 2008, 7 pages.
Claims, PCT/US2008/077528, 7 pages.

* cited by examiner

*Primary Examiner* — Kito R Robinson
(74) *Attorney, Agent, or Firm* — Hickman Palermo Truong Becker Bingham Wong LLP

(57) ABSTRACT

In one embodiment, an expression comprising a left-hand side and a right-hand side is received. The left-hand side specifies one or more market instruments, and the right-hand side specifies a method that is to be applied based on the left-hand side of the expression. The expression is parsed. A time series is generated by applying the method based on one or more sets of data values associated with the one or more market instruments. The generated time series is stored in computer data storage.

22 Claims, 12 Drawing Sheets

OBJECT-ORIENTED TIME SERIES GENERATOR

FIELD OF THE INVENTION

The present disclosure generally relates to techniques for analyzing market instruments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As used herein, "time series" refers to a mapping from timestamps to data values. The data values in a time series are measured and/or recorded at date-time points that are represented by the timestamps. A "market instrument" (or just "instrument") refers to a tradable element that has some kind of value. For example, any stocks and bonds and derivatives thereof (e.g. stock options, bond futures) may be represented as instruments that can be traded on stock markets and/or exchanges.

A user may be interested in many different types of time series of a particular market instrument. For example, a market analyst may be interested in seeing a chart that plots a time series comprising the closing price of the stock of Microsoft Corporation (ticker "MSFT"). Since the financial community is becoming more and more interested in analyzing a wider variety of asset classes and economy sectors, there is a growing need for analysis tools that are capable of generating different types of time series for a single market instrument as well as for combinations of market instruments. Some examples of such different types of time series include, without limitation, time series of the opening price, closing price, implied volatility (IVOL), historical volatility (HVOL) volume, market capitalization, relative strength index (RSI), dividend yield, 52-week low-high range, price-per-share to earnings-per-share (P/E) ratio and other valuation ratios, various profitability margins, and per-share earnings of market instruments.

However, the approaches used in currently available analysis tools lack the flexibility in generating time series and do not provide for interactively receiving user-specified parameters that determine the time series of interest to the user. For example, past approaches for generating time series typically provide for generating and displaying to a user only a particular type of time series (e.g. time series of the closing price of a given stock) without receiving any user input that defines the particular type of the time series or that determines the manner in which the time series is generated.

Another disadvantage of past approaches for generating time series is that a user is required to remember all options and parameters that are used in generating each particular type of time series. This may pose a serious problem to users that need to perform complex analysis based on multiple different types of time series for a large number of market instruments.

SUMMARY

In one embodiment, a computer-implemented process comprises the steps of: receiving an expression that comprises a left-hand side and a right-hand side, where the left-hand side specifies one or more data sets for one or more market instruments, and the right-hand side specifies a first method that is operable on the one or more data sets specified in the left-hand side of the expression; parsing the expression; generating a first time series by applying the first method on the one or more data sets associated with the one or more market instruments; and storing the first time series in computer data storage. In one feature, this embodiment further comprises the step of recursively performing the steps of parsing, generating, and storing based on a sub-expression included in the left-hand side of the expression.

In a feature of this embodiment, the first method may be a set of executable instructions which when executed are operable to construct and return time series. The generated first time series may be a sequence of data values associated with the one or more market instruments. The step of parsing the expression may further comprise recursively parsing the left-hand side and the right-hand side to generate an in-memory representation, such as, for example, an Abstract Syntax Tree (AST); and the step of generating the first time series may further comprise retrieving the one or more data sets from a data repository based on the in-memory representation.

In a feature of this embodiment, the computer-implemented process may further comprise: performing one or more mathematical computations on the one or more data sets to generate intermediate information; and applying the first method to the intermediate information to generate the first time series.

In a feature of this embodiment, the left-hand side of the expression may comprise a sub-expression, where the sub-expression comprises a second method which when evaluated returns a second time series. In this feature, the step of generating the first time series may comprise applying the second method to the one or more data sets to generate the second time series, and applying the first method to the second time series in order to generate the first time series.

In another embodiment, a computer-implemented process comprises the steps of: receiving user input that includes an expression comprising a left-hand side and a right-hand side, where the left-hand side specifies one or more market instruments, and the right-hand side specifies a first method that is operable on the one or more market instruments specified in the left-hand side of the expression; sending a request to generate a first time series, where the request includes first information based on the left-hand side and the right-hand side of the expression; in response to the request, receiving the first time series which is generated by applying the first method based on the one or more data sets associated with the one or more market instruments; and displaying a graphical representation of the first time series in a graphical user interface. In a feature of this embodiment, the step of receiving the user input may comprise receiving the left-hand side of the expression and automatically determining a default method as the first method based on the left-hand side. This default method is used in lieu of having a right-hand side to the expression.

In another embodiment, a graphical user interface (GUI) comprises a first GUI component configured to receive user input and a content pane configured to display graphical representations of time series. The user input may include an expression comprising a left-hand side and a right-hand side, where: the left-hand side specifies one or more market instruments; the right-hand side specifies a first method that is to be applied based on the left-hand side; and the left-hand side and the right-hand side are separated in the expression by a specific text character. After a time series is generated based on the user input, a graphical representation of the time series is displayed in the content pane of the GUI.

In a feature of this embodiment, the content pane may comprise a chart that includes a horizontal axis and a vertical axis, where the horizontal axis represents time and the vertical axis represents a scale for data values included in time series plotted on the chart.

In a feature of this embodiment, the GUI may further comprise a second GUI component that is displayed in response to the first GUI component receiving the left-hand side of the expression, where the second GUI component lists all methods that are available for the one or more market instruments specified in the left-hand side.

In a feature of this embodiment, the GUI may further comprise a second GUI component that is displayed as the first GUI component receives the right-hand side of the expression, where the second GUI component displays one or more parameters that are associated with the first method specified in the right-hand side.

Other embodiments may comprise a system and one or more machine-readable media operable to provide the foregoing graphical user interface and/or to perform or cause the performance of the foregoing computer-implemented processes.

DESCRIPTION OF EXAMPLE EMBODIMENTS

Figure 1:
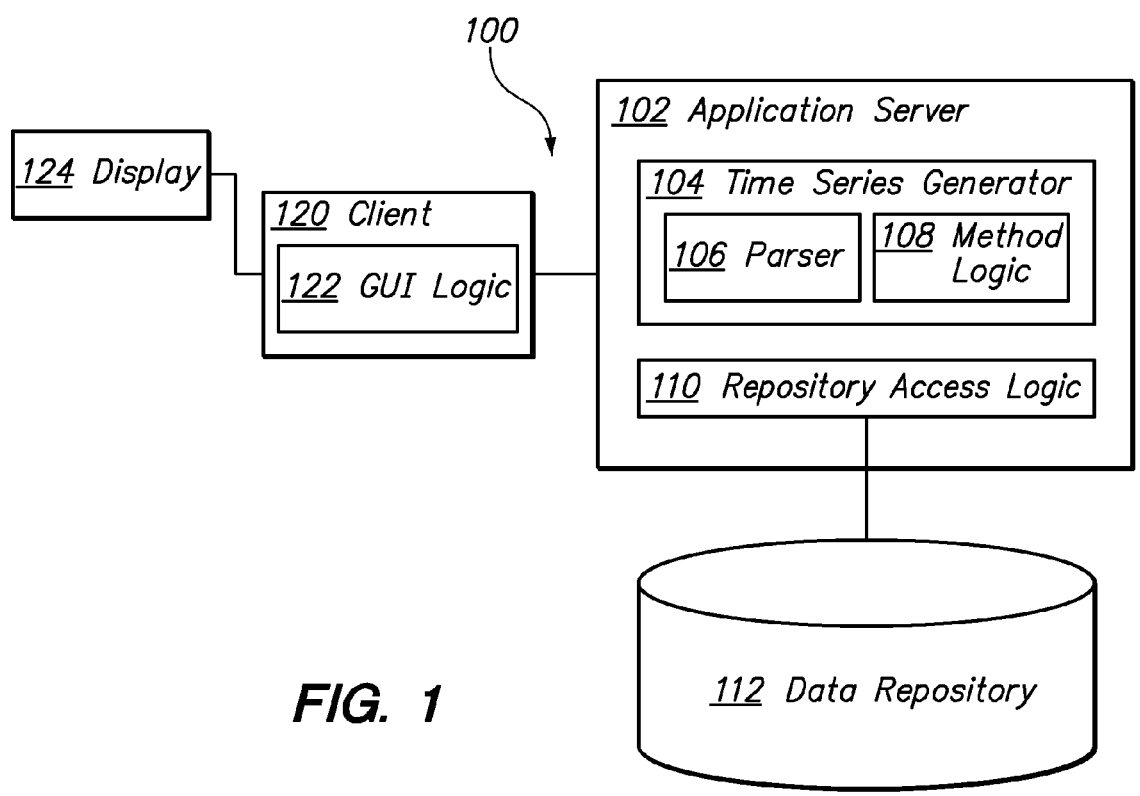
FIG. 1 illustrates an example system for generating time series according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Generating Time Series Based on User-Specified Expressions

Techniques are described herein for generating time series based on arbitrarily complex user-specified expressions.

As used herein, an "expression" refers to a sequence of characters which can be interpreted or evaluated by a computer. To "evaluate" an expression means to perform the computation that the expression specifies and to return the result of that computation. The returned result is referred to as the "value" or the "output" of the expression.

A simple expression may comprise a sequence of characters identifying a market instrument. For example, in one embodiment the expression "MSFT" evaluates to the Microsoft Corporation common-stock instrument. In other words, the output of the expression "MSFT" is a machine representation of the common stock instrument of Microsoft Corporation.

According to the techniques described herein, an expression may comprise a left-hand side and a right-hand side, where the left-hand side may itself be an expression and the right-hand side may be a sequence of characters identifying a method. (As used herein, the terms "left-hand side" and "right-hand side" do not necessarily indicate a "left" and "right" positional locations. Instead, the term "left-hand side" refers more broadly to an expression portion that generally specifies an expression, and the term "right-hand side" refers more broadly to an expression portion that generally specifies a method operable to produce a time series.)

As used herein, a "method" refers to a set of computer-executable instructions that is operable to construct and return a time series. A method is operable to take a data object as input and to produce a time series as output. A method is said to "operate on" its input, and "return" its output. The techniques described herein provide for two kinds of methods. An "instrument method" operates on an instrument and returns a time series. A "time series method" operates on a time series and returns a different time series. Methods may operate on and return other types of data, and the examples of methods provided herein should be regarded in an illustrative rather than a restrictive sense.

In some embodiments, an expression may comprise a left-hand side and a right-hand side, where the left-hand side is an expression that evaluates to an instrument, and the right-hand side is an instrument method. The output of the entire expression is the result of applying the instrument method to the result of evaluating the left-hand side, i.e., to the instrument specified by the left-hand side. In these embodiments, applying the instrument method to the instrument may comprise retrieving a time series from a database repository. For example, in the expression "MSFT.CLOSE", the left-hand side "MSFT" evaluates to the common stock of Microsoft Corporation, and the right-hand side "CLOSE" specifies the instrument method that returns a time series of the closing price of the "MSFT" instrument. Thus, the output of the entire expression "MSFT.CLOSE" is a time series of the closing price of the common stock of the Microsoft Corporation.

In some embodiments, an expression may comprise a left-hand side and a right-hand side, where the left-hand side is an expression that evaluates to a time series, and the right-hand side is a time series method. The output of the entire expression is the result of applying the time series method to the result of evaluating the left-hand side. In these embodiments, applying a time series method to a time series comprises creating a new time series, derived from the input time series, that is the result of applying some operation or transformation to the input time series. For example, in the expression "MSFT.CLOSE.HVOL", the left-hand side "MSFT.CLOSE" evaluates to a time series that represents the closing price of the "MSFT" instrument, and the right-hand side "HVOL" specifies a time series method that returns a time series of historical volatility values. Thus, the output of the entire expression "MSFT.CLOSE.HVOL" is a time series of the historical volatility computed over the time series of the closing price of the common stock of the Microsoft Corporation.

In some embodiments, an expression may comprise a left-hand side and a right-hand side, where the left-hand side is an expression that evaluates to a time series, and the right-hand side is a time series method along with values for one or more parameters of the method. The output of the entire expression is the result of applying the time series method to the result of evaluating the left-hand side, while additionally specifying as input to the method the values for its one or more parameters. For example, in the expression "MSFT.CLOSE.HVOL(100)", the left-hand side "MSFT.CLOSE" evaluates to a time series of the closing price of the "MSFT" instrument. The right-hand side "HVOL(100)" specifies a time series method with a parameter indicating that historical volatility needs to computed over the past 100 trading days. The output of the entire expression "MSFT.CLOSE.HVOL(100)" is a time series of the historical volatility computed for the past 100 trading days over the time series of the closing price of the "MSFT" instrument.

In some embodiments, an expression may comprise a left-hand side and a right-hand side, where the left-hand side is an expression that evaluates to a time series, the right-hand side is an expression that evaluates to a time series, and the two expressions are joined by a binary operator (which may be included in, but is not restricted to, the set of {+, −, *, /}). The output of the entire expression is a time series resulting from applying the binary operator to the results of evaluating the left and right-hand sides. For example, in the expression "MSFT.CLOSE+GOOG.CLOSE", the left-hand side evaluates to a time series of the closing price of the "MSFT" instrument, and the right-hand-side evaluates to a time series of the closing price of the "GOOG" instrument (where the expression "GOOG" evaluates to a machine representation of the common stock instrument of Google, Inc.) The output of the entire expression "MSFT.CLOSE+GOOG.CLOSE" is a time series of the pair-wise sums of the closing prices of the "MSFT" and "GOOG" instruments. In another example, the expression "3*MSFT.CLOSE" evaluates to a time series in which the data values are three times the closing price of the "MSFT" instrument for each day represented in the time series.

II. Example System for Generating Time Series

FIG. 1 illustrates an example system for generating or accessing time series according to one embodiment. System 100 comprises application server 102 and one or more clients, such as client 120.

In the embodiment illustrated in FIG. 1, client 120 is communicatively connected to application server 102 over a network. Client 120 may be implemented in a computer system as a set of program instructions recorded on a machine-readable storage medium. Client 120 comprises GUI logic 122. GUI logic 122 may be a set of program instructions which, when executed by one or more processors of the computer system, are operable to receive user input and to display a graphical representation of a generated time series. GUI logic 122 may be operable to receive user input from, and to display generated time series into, a graphical user interface that is provided on display 124 by the computer system on which client 120 executes.

Application server 102 may be implemented in a computer system as a set of program instructions recorded on a machine-readable storage medium. When executed by one or more processors of the computer system, application server 102 is operable to generate and/or access time series according to the techniques described herein. In one embodiment, application server 102 may be implemented in a Java Virtual Machine (JVM) that is executing in a distributed or non-distributed computer system. In other embodiments, application server 102 may be implemented as a computer system process that is a combination of programming instructions written in any programming language (e.g. C++ or Visual Basic) and hardware components (e.g. memory, CPU time) that have been allocated for executing the program instructions.

Among other components, application server 102 comprises repository access logic 110 and time series generator 104. Repository access logic 110 is a set of program instructions which, when executed by one or more processors, are operable to access and retrieve data from data repository 112. For example, repository access logic 110 may be a database client or an Open Database Connectivity (ODBC) client that supports calls to a database server that manages data repository 112. Data repository 112 may be any type of structured storage for storing data including, but not limited to, relational or object-oriented databases, data warehouses, directories, data files, and any other structured data storage.

According to the techniques described herein, time series generator 104 is operable to generate or access time series based on input received from a client. In the embodiment illustrated in FIG. 1, time series generator 104 comprises parser 106 and method logic 108. Time series generator 104 is object-oriented. As used herein, a set of data values that can be used by a time-series generator to generate a time series is referred to as "object"; thus, an "object-oriented" time-series generator is a generator that is operable to generate time series from one or more data objects. Examples of such data objects include, without limitation, a time series and a market instrument.

Parser 106 is a set of program instructions which, when executed by one or more processors, are operable to parse (e.g. recursively) input received from a client according to a set of syntax rules and to generate an in-memory representation of the input. According to the techniques described herein, the set of syntax rules supports parsing of complex expressions through which a user may request the generation of any type of time series in a user-friendly and intuitive way. As used herein, "in-memory representation" refers to a data structure that is generated by parsing an expression. Examples of in-memory representations may include Abstract Syntax Trees (ASTs), tables, and any other structures that may be used in determining what actions or operations need to be performed based on a provided expression.

Method logic 108 is a set of program instructions that implement one or more methods for generating or accessing one or more types of time series. The data values in a time series are measured and/or recorded at date-time points that are represented by the timestamps. For example, a time series may comprise a set of closing price values of a stock recorded at the close of a market on successive days, or a set of intraday bond yields that occurred at successive hours in a trading day. The values in a time series may be stored in one or more data repositories of any type such as, for example, data repository 112.

According to the techniques for generating time series described herein, time series generator 104 receives a request for generating a time series from client 120. The request may include an expression that comprises a left-hand side and a right-hand side. The left-hand side of the received expression may evaluate to a single market instrument or time series, and the right-hand side of the received expression may include information that specifies a method implemented in method logic 108.

Parser 106 parses the received expression according to a set of syntax rules and generates an in-memory representation. In some embodiments, in generating the in-memory representation, parser 106 may recursively parse the left-hand side and/or the right-hand side of the received expression. The in-memory representation (e.g. an AST) identifies one or more sets of data values associated with the one or more market instruments, and is used to locate the sets of data values in data repository 112. Repository access logic 110 retrieves the sets of data values from data repository 112 and stores the data values in one or more logical data structures (e.g. arrays) that can be accessed by method logic 108. Thereafter, method logic 108 applies the method identified in the in-memory representation to the one or more sets of data values, and the method constructs and returns a time series.

In some operational contexts, the left-hand side of an expression may include one or more sub-expressions that themselves include properly formatted left-hand sides, and the right-hand side of the expression identifies a method for generating or accessing time series. In these operational contexts, parser 106 and method logic 108 may be recursively invoked to parse each sub-expression and to generate intermediate time series by applying the specified methods, where the intermediate time series may then be used as inputs in a recursive invocation of method logic 106.

Time series generator 104 stores the generated time series in computer data storage. As used herein, "computer data storage" refers to a data structure, which is operable to store data and which may be accessed by a computing device such as, for example, a computer system. A computer data storage may be physically stored in any volatile and/or non-volatile machine-readable medium. In some embodiments a computer data storage for storing time series may be implemented in a storage device that includes persistent, non-volatile media such as optical or electromagnetic disks. In some embodiments, a computer data storage for storing time series may be implemented in a storage device that includes volatile media such as RAM or other dynamic memory. The techniques described herein are not limited to storing time series in any particular type of computer data storage or on any particular type of machine-readable medium.

As an operational example, suppose that a user wants to see the time series of the closing price of the Microsoft Corp. (ticker "MSFT") stock plotted on a chart. Through a graphical user interface provided by a computer system in which client 120 is executing, the user enters the expression

MSFT.CLOSE where the left-hand side "MSFT" evaluates to a machine representation of the Microsoft Corp. stock instrument, and the right-hand side "CLOSE" identifies the method which needs to be applied to generate or access the desired time series. GUI logic 122 receives the above expression through the graphical user interface, and sends or causes the expression to be sent to time series generator 104 in application server 102.

Time series generator 104 receives the expression input by the user, and parser 106 parses the input to generate an in-memory representation thereof. Time series generator 104 then causes method logic 108 to invoke repository access logic 110 based on the in-memory representation. Repository access logic 110 looks up and retrieves from data repository 112 a set of the closing price values of the "MSFT" instrument. Thereafter, method logic 108 applies the "CLOSE" method to the retrieved set of values. When applied, the method constructs a time series by arranging the closing price values of the "MSFT" instrument in a sequence. Time series generator 104 (or another component thereof, e.g. method logic 108) then stores the generated time series in a logical data structure, for example, an array. Time series generator 104 then sends the data structure with the generated time series back to client 102.

In response to receiving the data structure with the generated time series, client 120 causes GUI logic 122 to plot a graphical representation of the time series in a graphical user interface on display 124. The graphical representation of the time series may be selected by the user to be, for example, an unbroken line.

The techniques described herein provide a user with the ability to generate a time series from an expression of arbitrary complexity. The techniques described herein provide for recursively parsing the user-specified expression, and treating any sets of data values identified therein as objects to which a time-series generating method can be applied. In some embodiments, the sets of data values may be values that are looked up in a data repository based on parameters indicated in the user-specified expression. In other embodiments, the user-specified expression may indicate that the objects to which a time-series generating method is to be applied are themselves time series associated with market instruments specified in the expression. In this manner, the techniques described herein provide a user with an intuitive and flexible way to generate or access any type of time series based on user input that defines how the time series are to be generated.

As illustrated in FIG. 1, in some embodiments the techniques described herein may be implemented as an application in a client-server paradigm. In these embodiments, a client component of the application may provide a graphical user interface that is configured to receive user input and to display results to a user, and a server component of the application may be operable to generate or access a time series based on the user input. In other embodiments, some of the functionalities of the server component may be performed at the client component. For example, a client component may be operable to parse the user input and to pass parsed information to the server component, which would generate or access a time series based on the parsed information as described herein.

In some embodiments, the techniques for generating time series described herein may be implemented as a standalone application that is executing on a distributed or a non-distributed computer system. In other embodiments, the techniques described herein may be implemented as web-based services operating in a Service-Oriented Architecture (SOA) framework. Thus, the techniques described herein are not limited to implementation in any specific application paradigm or on any specific type of computer system, and for this reason the example embodiments described herein are to be regarded as in an illustrative rather than a restrictive sense.

Example Embodiments for Generating Time Series

Figure 2A:
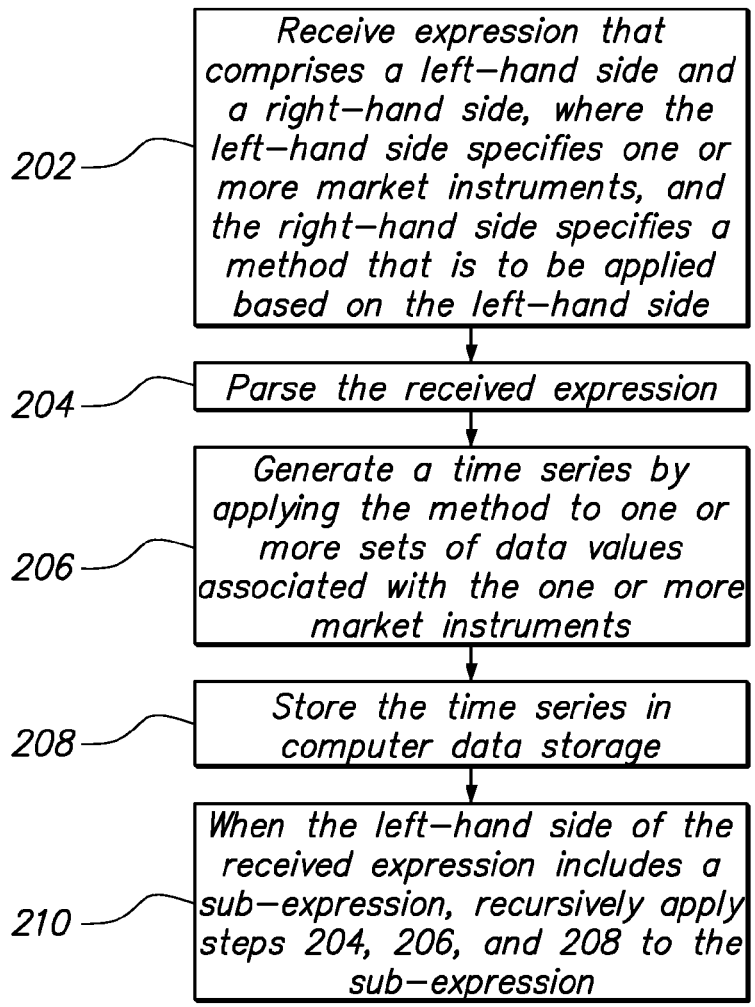
FIG. 2A illustrates an example process for generating time series according to one embodiment.

FIG. 2A illustrates an example server-side process for generating time series according to one embodiment.

In step 202, an expression that comprises a left-hand side and a right-hand side is received. The left-hand side includes information that identifies one or more market instruments, and the right-hand side includes information that specifies a method that is to be applied based on the information specified in the left-hand side. For example, the received expression may be (MSFT.CLOSE+GOOG.CLOSE).HVOL The left-hand side, "(MSFT.CLOSE+GOOG.CLOSE)", of the received expression is recursively parsed and evaluated to a time series. Evaluation of the left-hand side to a time series involves adding the value of the closing price of the "GOOG" instrument to the closing price of "MSFT" instrument on each day (piecewise addition) to generate a new time series. The right-hand side specifies the "HVOL" method which is operable to construct and return a time series of the historical volatility of the time series (or object) that is obtained by evaluating the left-hand side of the received expression.

It is noted that the techniques for generating time series described herein are not limited to any particular types of market instruments or to any particular types of time series for such instruments. For example, the market instruments may represent any types of stocks and bonds and derivatives thereof (e.g. stock options, bond futures) that can be traded on stock markets or exchanges. The market instruments may also represent various types of commodities (e.g., crude oil, natural gas, gold, etc.) and may be traded on commodities markets or exchanges. The market instruments may also represent various financial assets and any derivatives thereof, for example, currencies, securities, loans, and various financial derivatives such as futures, options, swaps, and exotic derivatives. Examples of time series that can be generated for market instruments according to the techniques described herein include, but are not limited to, opening price time series, closing price time series, implied volatility (IVOL) time series, historical volatility (HVOL) time series, volume time series, market capitalization time series, relative strength index (RSI) time series, dividend yield time series, low-high range time series, time series of price-per-share to earnings-per-share (P/E) ratio and other valuation ratios, times series of various profitability margins, and per-share earnings time series. Thus, the examples provided herein of market instruments and types of time series thereof are not in any way limiting and are to be regarded in an illustrative rather than a restrictive sense.

Figure 2B:
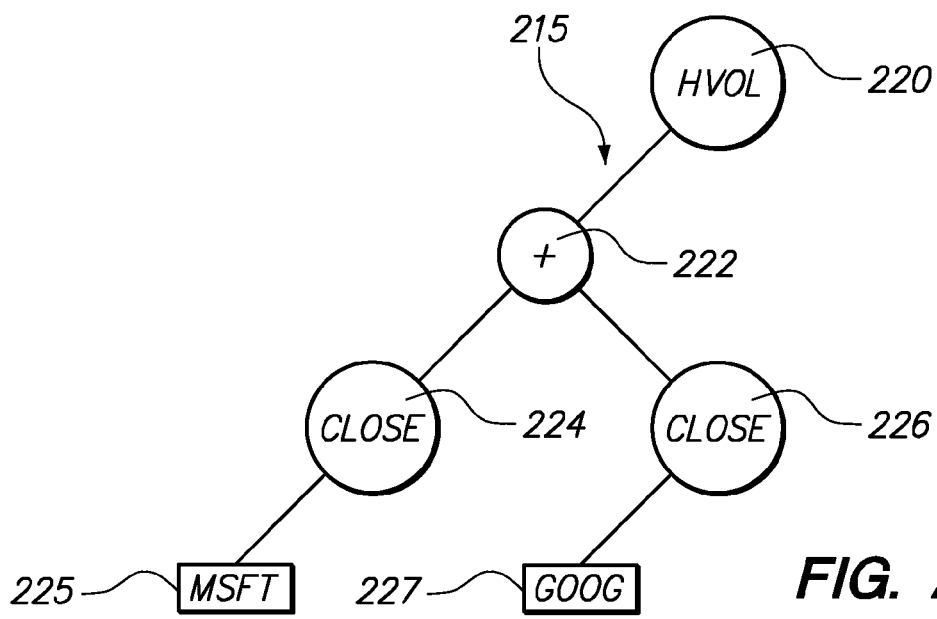
FIG. 2B illustrates a block diagram of a computer-generated tree representing an expression according to one embodiment.

In step 204, the received expression is parsed. For example, the expression described above, (MSFT.CLOSE+GOOG.CLOSE).HVOL may be recursively parsed to generate an AST, based on which the expression may be evaluated to generate a time series. FIG. 2B illustrates a block diagram of a tree in-memory representation of the above expression. The "HVOL" method is represented at root node 220 of in-memory tree 215. Node 222 represents the addition operator "+" as the left sub-tree of root node 220; root node 220 is not associated with a right sub-tree. Node 224 represents the "CLOSE" method as the left sub-tree of node 222, and node 226 represents the "CLOSE" method as the right sub-tree of node 222. Node 225 represents the machine representation of the "MSFT" instrument as the left leaf node of node 224; node 224 is not associated with a right leaf node. Node 227 represents the machine representation of the "GOOG" instrument as the left leaf node of node 226; node 226 is not associated with a right leaf node.

Referring back to FIG. 2A, in step 206 a time series is generated by applying the method specified in the right-hand side of the expression to the result of evaluating the entire left-hand side of the expression, where the result of evaluating the left-hand side may be a set of data values or another time series. For example, a time series generator such as time series generator 104 illustrated in FIG. 1 may receive the input, parse it, and based on the parsed information may apply a method to generate the requested time series.

In step 208, the generated time series is stored in computer data storage. For example, after generating the time series requested in the user expression, a time series generator may store the time series in volatile memory as part of transferring the time series to a client that is operable to display a graphical representation of the time series in a graphical user interface. Alternatively, or in addition to, the time series generator may store the time series in persistent storage (e.g. hard disk) for subsequent use.

In some implementations, a method may generate a time series by looking up the necessary data values in a data repository based on parameters specified in the expression received from the user, retrieving these data values, and then arranging these data values in a sequence. One example of such method is the "CLOSE" method which is operable to construct and return the time series of the closing price of a specified instrument. Another example of such method is the "MARKETCAP" method which is operable to construct and return the time series of the market capitalization of a specified instrument.

In some implementations, in addition to looking up data values in a data repository and arranging the data values in a sequence, a method may perform some other computations and/or operations when generating a time series. For example, the "HVOL" method is operable to construct and return a historical volatility time series by computing a volatility formula based on the set of data values to which the method is applied, where the volatility formula evaluates how much the set of data values changes day to day.

In some implementations, the time series generated according to the techniques described herein may be bound by a start date and an end date that are determined based on the data available in a given data repository. In some implementations, a time series generator may use default start and end dates when generating a time series. In some implementations, a user may additionally provide input that indicates the start and end dates for the time series that the user needs to get generated. It is noted that the techniques for generating time series described herein may be used to facilitate the generation of time series with any start and end dates provided that the requisite data for the time series is stored in a data repository or can otherwise be accessed and retrieved.

Referring back to FIG. 2A, step 210 may be performed in embodiments in which the syntax rules used to parse the received expression support proper sub-expressions in the left-hand side of the received expression. In these embodiments, step 210 provides for recursively performing steps 204, 206, and 208 to one or more sub-expressions when such sub-expressions are included in the left-hand side of the received expression.

Figure 2C:
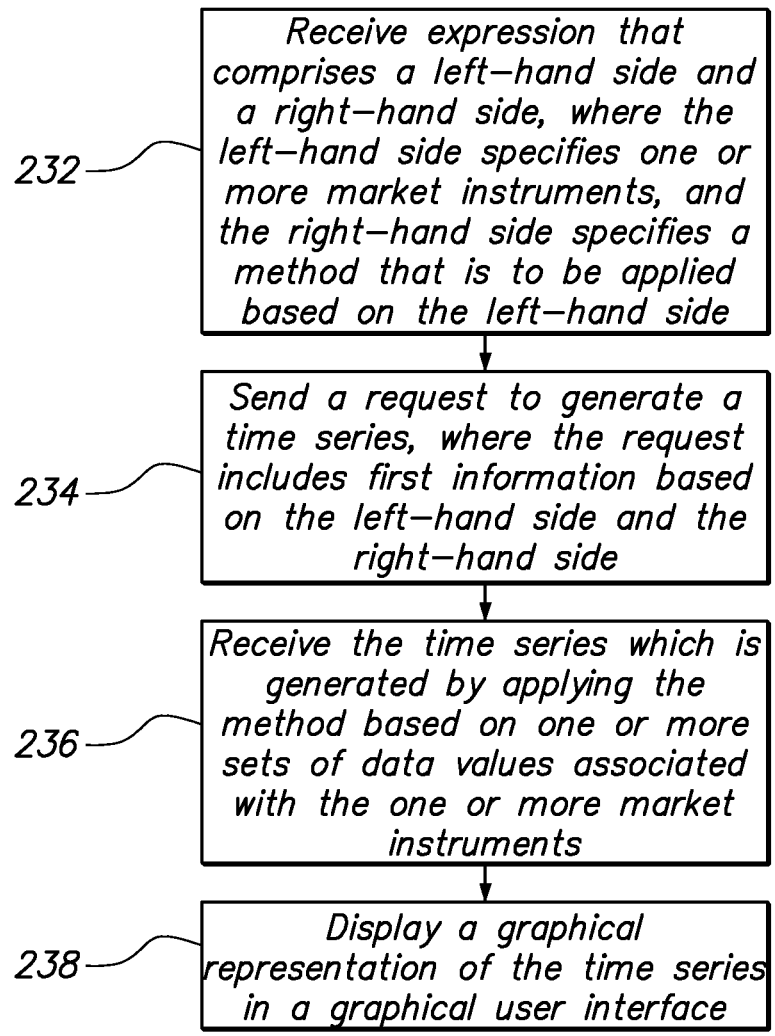
FIG. 2C illustrates an example process for causing the generation and display of time series according to one embodiment.

FIG. 2C illustrates an example client-side process for causing the generation and display of time series according to one embodiment.

In step 232, an expression that comprises a left-hand side and a right-hand side is received from a user. For example, a client may receive the user expression through one or more components of a graphical user interface provided by the client. The left-hand side of the expression includes information that identifies one or more market instruments, and the right-hand side of the expression includes information specifying a method that is to be applied to the output of the left-hand side.

In step 234, a request to generate a time series is sent to a time series generator. The request includes information that is based on the left-hand side and the right-hand side of the expression. For example, in some implementations a client may be operable to receive the user expression from a graphical user interface, and to send the received expression to the time series generator in a request formatted according to some particular format or protocol. In other implementations, the client may receive the user expression and may parse the expression into some intermediate parsed information. For example, the client may generate an in-memory representation of the received expression such as an AST. Then, the client would send the intermediate information to the time series generator instead of the received expression itself. In this manner, the client may offload parsing from the time series generator.

In step 236, a time series is received in response to the request sent in step 234. The time series is generated by applying the method specified in the right-hand side of the user expression to one or more sets of data values associated with the one or more market instruments specified in the left-hand side. For example, the time series may be received in the form of an array that is generated and sent by a time series generator.

In step 238, a graphical representation of the received time series is displayed in a graphical user interface. For example, a client that received the user expression may be operable to plot on a chart the time series that was generated based on the expression. The graphical representation of the time series may be any graphical object that is suitable for presenting a time series including, but not limited to, an unbroken line, a Open-High-Low-Close (OHLC) bar, or candle bar.

IV. Example Graphical User Interface

Figure 3:
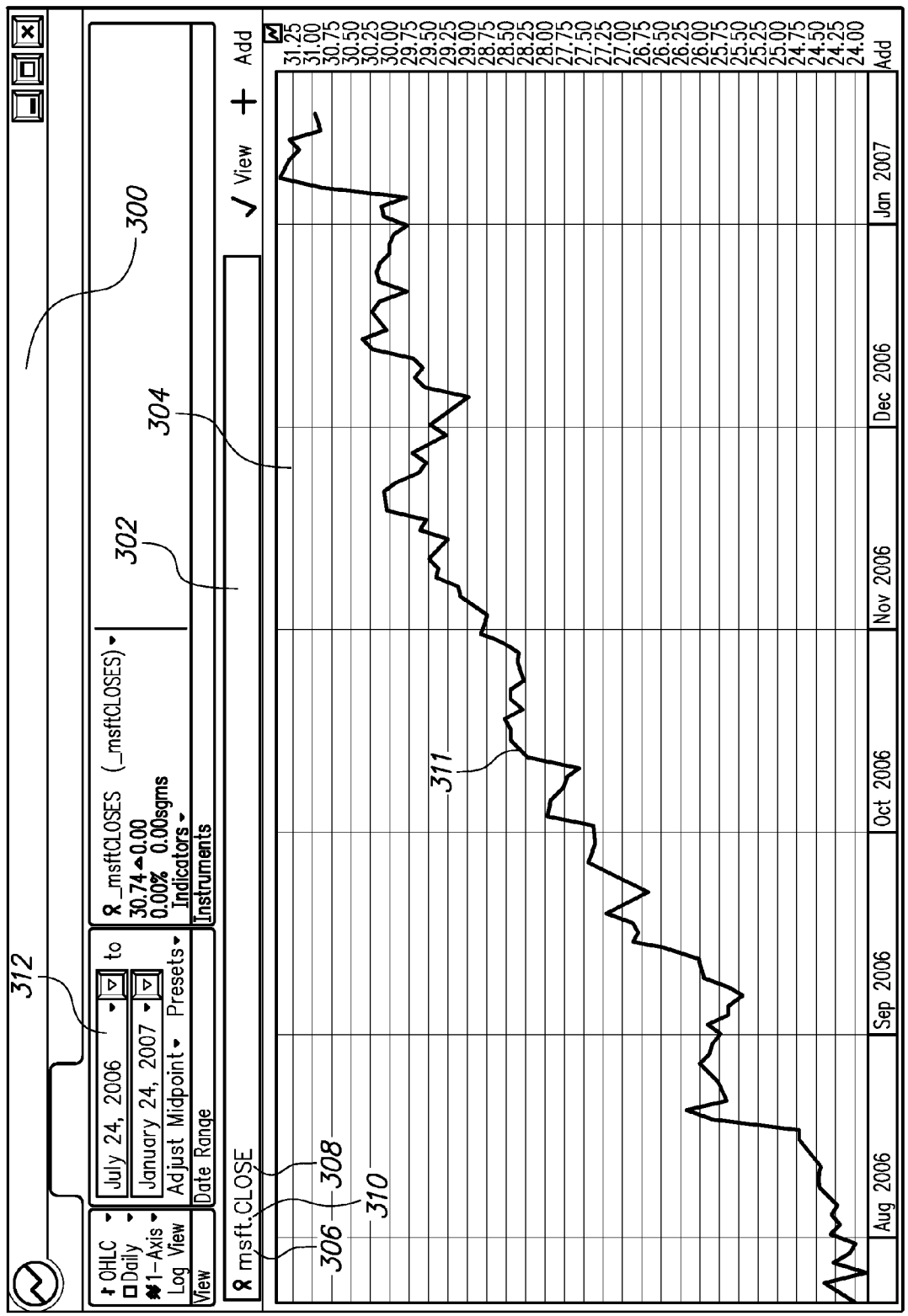
FIG. 3 illustrates an example graphical user interface according to one embodiment.

FIG. 3 illustrates an example of a graphical user interface that may be used to receive user input and to display representations of time series generated according to the techniques described herein. In an example embodiment, the graphical user interface may be implemented as a set of program instructions which, when executed by one or more processors, are operable to render the graphical user interface on the display of a computer system. In some embodiments, the set of program instructions operable to generate the graphical user interface may be included in a standalone application, which is also operable to perform the techniques described herein for generating time series. In some embodiments, the set of program instructions operable to generate the graphical user interface may be included in a client component of a client-server application, where the server component of the client-server application is operable to generate time series as described herein. In some embodiments, the set of program instructions operable to generate the graphical user interface may be included in a server or service, where the server or service is operable to generate time series and to communicate instructions for rendering the graphical user interface and graphical representations of time series to a client which in turn is operable to display the graphical user interface on a display.

FIG. 3 illustrates graphical user interface 300. Graphical user interface 300 comprises a plurality of GUI components and one or more content panes such as content pane 304. As used herein, "content pane" refers to a graphical representation object that is configurable to include one or more GUI components. Content panes may be included in frames. A "frame" refers to a graphical representation object that is configurable to include one or more content panes and/or GUI components. Examples of frames include, but are not limited to, dialog boxes, forms, and various other types of window containers.

Content pane 304 comprises a chart on which a generated time series may be plotted. In the example embodiment illustrated in FIG. 3, the horizontal axis of the chart is a time axis and the vertical axis of the chart reflects the magnitude of the data values included in the time series. A time series may be plotted on the chart as an unbroken line. Other examples of graphical representations for a time series include, but are not limited to, OHLC bars and candle bars.

The plurality of GUI components in graphical user interface 300 may include one or more GUI components 312 that are configured to receive user input specifying a range of dates which define the portion of a generated time series that is going to be plotted in content pane 304. As illustrated in FIG. 3, GUI components 312 may comprise a pair of text fields configured to receive a start date and an end date as text input from a user. In some embodiments, GUI components 312 may include a calendar GUI component that is configured to receive user input that selects the start date and the end date from a calendar pane.

The plurality of GUI components in graphical user interface 300 also includes GUI component 302 that is configured to receive user input that specifies information for generating a time series. GUI component 302 may be a text field configured to receive text input from a user, where the text input may be an expression comprising a left-hand side and a right-hand side that are separated by a specific character. As illustrated in FIG. 3, the text input enterable in GUI component 302 may comprise left-hand side 306 that specifies an expression identifying one or more market instruments, right-hand side 308 that specifies a method that is to be applied to generate a time series, and character 310 which separates the left-hand side and the right-hand side in a manner that is intuitive to a user. In various embodiments, different characters may be used for character 310 depending on the particular configuration and syntax rules used by the parser in the particular time series generator. Examples of character 310 may include, without limitations, the period character ".", the colon character":", the pipe character "|", the question mark character "?", and the exclamation mark character "!".

In the operational example illustrated in FIG. 3, suppose that a user wants to see a chart of the time series of the closing price of the "MSFT" stock instrument during the period of Jul. 24, 2006 to Jan. 24, 2007. The user enters in GUI components 312 the start date "Jul. 24, 2006" and the end date "Jan. 24, 2007", which identify the time period for which the generated time series is going to be plotted. In order to request the generation of a time series of the closing price of the "MSFT" instrument, the user enters in GUI component 302 the following expression:

MSFT.CLOSE

Thereafter, the user may hit the "Return" button on her keyboard or to activate another GUI component in graphical user interface 300 in order to request generation of the time series specified in GUI component 302.

In response to receiving the user input in GUI component 302, logic associated with graphical user interface 300 sends the input in a request to a time series generator that is operable to generate time series as described herein. For example, the time series generator receives the request and parses the input therein to determine that a time series of the closing price of the "MSFT" instrument needs to be generated. The time series generator then retrieves the necessary data values from a data repository, and applies the "CLOSE" method thereto. When applied the "CLOSE" method constructs a time series from the set of retrieved data values, and the time series generator returns the generated time series to the logic that sent the request.

The logic associated with graphical user interface 300 receives the time series and plots it as unbroken line 311 on the chart in content pane 304.

In this manner, the techniques described herein provide mechanisms that can be used by a user to easily generate any time series of interest to the user. The format of the user input supported by the techniques described herein allow the generation of time series to be centered around the instrument or instruments that the user is interested in. Further, the format of the user input supported by the techniques described herein is more intuitive to the user and reflects the way the user thinks of market instruments.

V. Additional Features and Alternative Embodiments

The techniques for generating time series described herein provide a set of syntax rules and graphical user interfaces that allow a user to generate a time series based on complex expressions that may specify one or more market instruments, one or more operations or computations that are to be performed with respect to data associated with the market instruments, and one or more methods that may be used to return a time series. Thus, the techniques described herein provide for great flexibility in meeting user needs when it comes to generating a wide variety of time series for various market instruments.

In addition, the techniques described herein provide for presenting to the user a variety of options and parameters that are available for particular methods, thus making the time series generation process much more user-friendly and intuitive. According to the techniques described herein, at any point during the construction of an expression for generating a time series, the user is presented with the available methods and parameters thereof based on which a time series can be generated. The left-hand side of the expression would determine the appropriate context for which methods are applicable, and the method specified in the right-hand side of the expression would determine the appropriate context for which method parameters are applicable. Thus, the user is relieved of the necessity to remember or know the options and parameters associated with each different time series type.

Some examples of the syntax rules and method options and parameters supported by the techniques described herein are provided in the subsections that follow.

Supporting Default Methods

In some embodiments, the techniques described herein support default methods. A "default method" refers to a method that is determined automatically without being expressly specified by a user in the input that requests the generation of a time series. According to the techniques described herein, any method that returns time series and is commonly used by users may be designated as a default method.

For example, in one embodiment the "CLOSE" method may be designated as the default method. The "CLOSE" method generates a time series of a closing price, which is one of the more commonly used types of time series. In this embodiment, the user may provide input that only specifies an expression identifying one or more market instruments, for example

MSFT but does not identify any particular method for generating a time series. In response to receiving such input, in this embodiment the default "CLOSE" method is automatically determined and applied by a time series generator to generate the time series for the specified market instrument (the "MSFT" stock in the above example). An alternative embodiment that would be useful for displaying time series data on charts would be to have "MSFT" stock default to the set of four time series representing the "MSFT" instrument's open, high, low, and close values respectively, so that they may be rendered in a bar or candle layout on the chart.

Displaying Supported Methods

In one embodiment, the techniques described herein provide for displaying prompts or menus that indicate to the user the methods that are supported by a time series generator for a particular instrument specified by a user. In some implementations, the same static set of methods is displayed to a user when the user enters the identifier of a particular instrument. In other implementations, the available methods may be determined dynamically instrument-by-instrument based on certain instrument-specific criteria, for example, whether enough data values for constructing a time series are stored in a data repository for a particular instrument.

Figure 4:
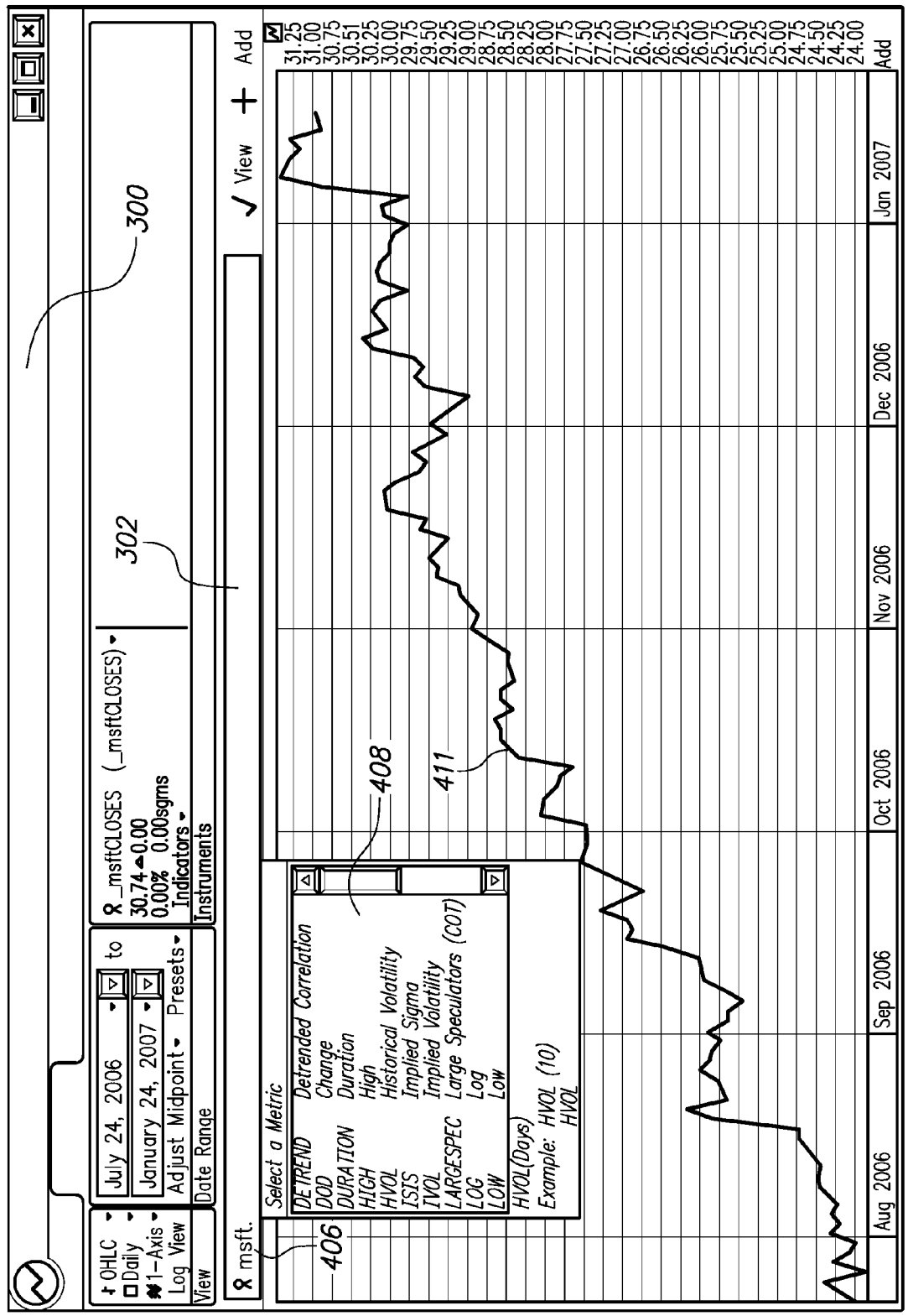
FIG. 4 illustrates an example graphical user interface according to another embodiment.

FIG. 4 illustrates an example graphical user interface that automatically displays supported methods according to one embodiment. Suppose that a user wants to see a chart of some time series associated the "MSFT" stock instrument. The user enters the identifier 406 of the "MSFT" stock instrument in GUI component 302, followed by the period character "." which indicates that the user is about to specify a method. In response to receiving the period character, logic associated with graphical user interface 300 automatically displays or pops up GUI component 408 that displays all available methods for the "MSFT" instrument. In the example of FIG. 4, GUI component 408 is a list box that lists the various methods which a time series generator may apply to data values associated with the "MSFT" instrument to return a time series. When the user selects a method in GUI component 408, the logic associated with graphical user interface 300 may also display any options and parameters that are available for the selected method. In the example of FIG. 4, the selected method is the "HVOL" method, and the usage options and method parameters are specified by the logic at the bottom of list box 408. After the user selects a method and enters input requesting that a time series be generated, a time series generator generates and returns a time series. Graphical representation 411 of the generated time series is then plotted on the chart in graphical user interface 300.

Displaying Supported Method Parameters

According to the techniques described herein, methods operable to construct and return time series may take one or more parameters that affect how the method is applied to data values. The method parameters may be user-specified or provided by default.

Figure 5:
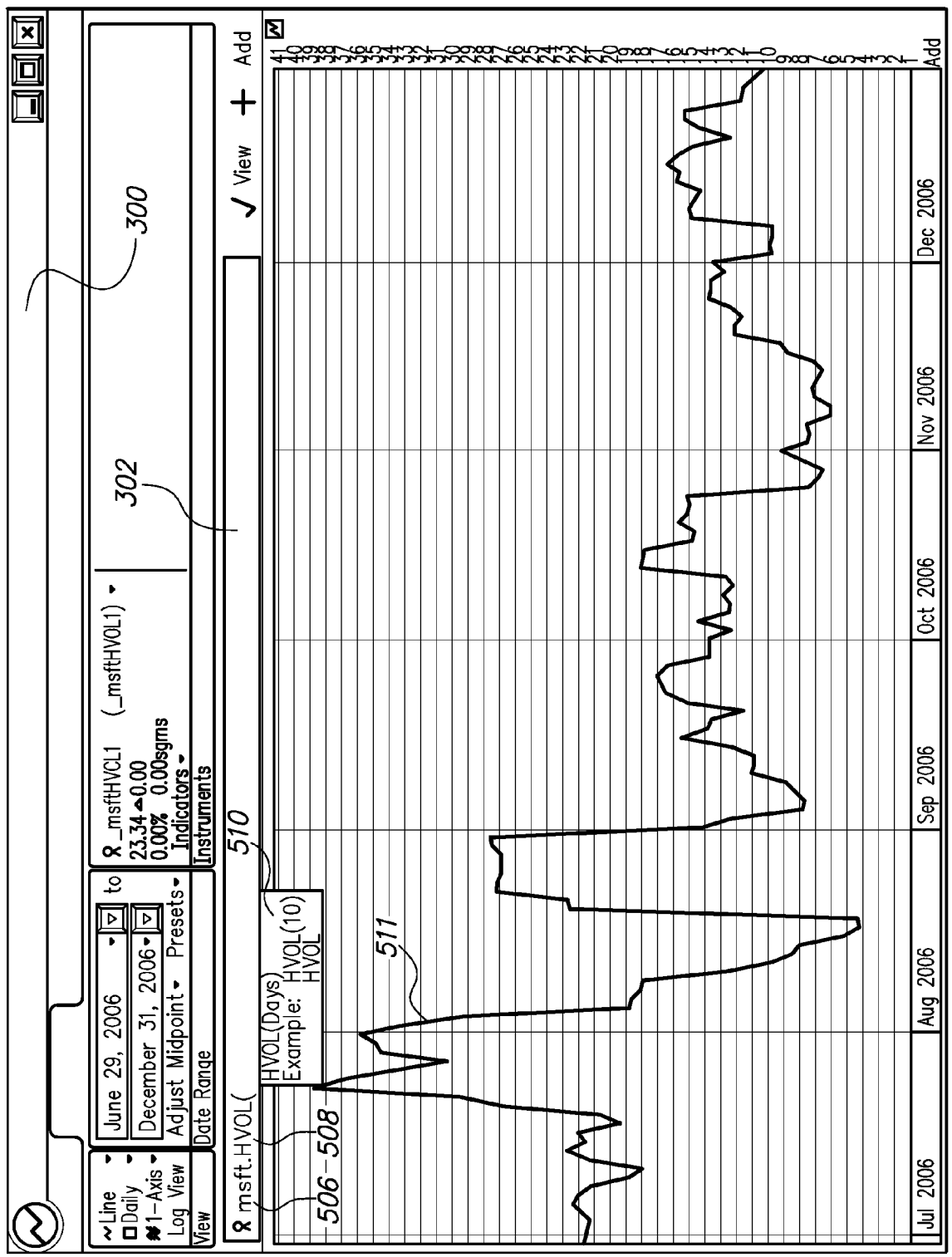
FIG. 5 illustrates an example graphical user interface according to another embodiment.

In one embodiment, the techniques described herein provide for displaying prompts or menus that indicate to the user the method parameters that are associated with a particular method specified by a user. FIG. 5 illustrates an example graphical user interface that automatically displays method parameters for a user-selected method according to this embodiment.

Suppose that a user wants to see a chart of the time series of the historical volatility of the "MSFT" stock instrument, where the historical volatility needs to be computed over a certain period of time. The user enters in GUI component 302 an expression that comprises left-hand side 506 which specifies the identifier of the "MSFT" stock instrument, followed by the period character ".", followed by right-hand side 508 which specifies the "HVOL" method, followed by a left parenthesis which indicates that the user is about to specify a parameter for the method. In response to receiving the left parenthesis, logic associated with graphical user interface 300 automatically displays or pops up a GUI component 510 which displays all parameters for the "HVOL" method. In the example of FIG. 5, GUI component 510 is a text box which specifies that the "HVOL" method takes one duration parameter. The duration parameter is the number of the past trading days for which historical volatility needs to be computed. GUI component 510 also provides examples of how the "HVOL" method may be specified with or without a duration parameter. After the user enters the desired duration parameter and enters input requesting that a time series be generated, a time series generator generates and returns a time series. Graphical representation 511 of the generated time series is then plotted on the chart in graphical user interface 300.

Providing Instruments as Method Parameters

According to the techniques described herein, time series generators support syntax rules that allow some methods to take as parameters market instruments or time series thereof. This provides for great flexibility and allows a user to request the generation of arbitrarily complex time series.

An example of a method that takes as parameters other instruments is the "CORREL" method. The "CORREL" method is operable to construct and return a time series that includes as values correlation coefficients that are computed between time series of the caller and callee instruments for a time period of a particular duration. The callee instrument is the instrument specified as a parameter for a method which is to be applied to a time series of the caller instrument.

Figure 6:
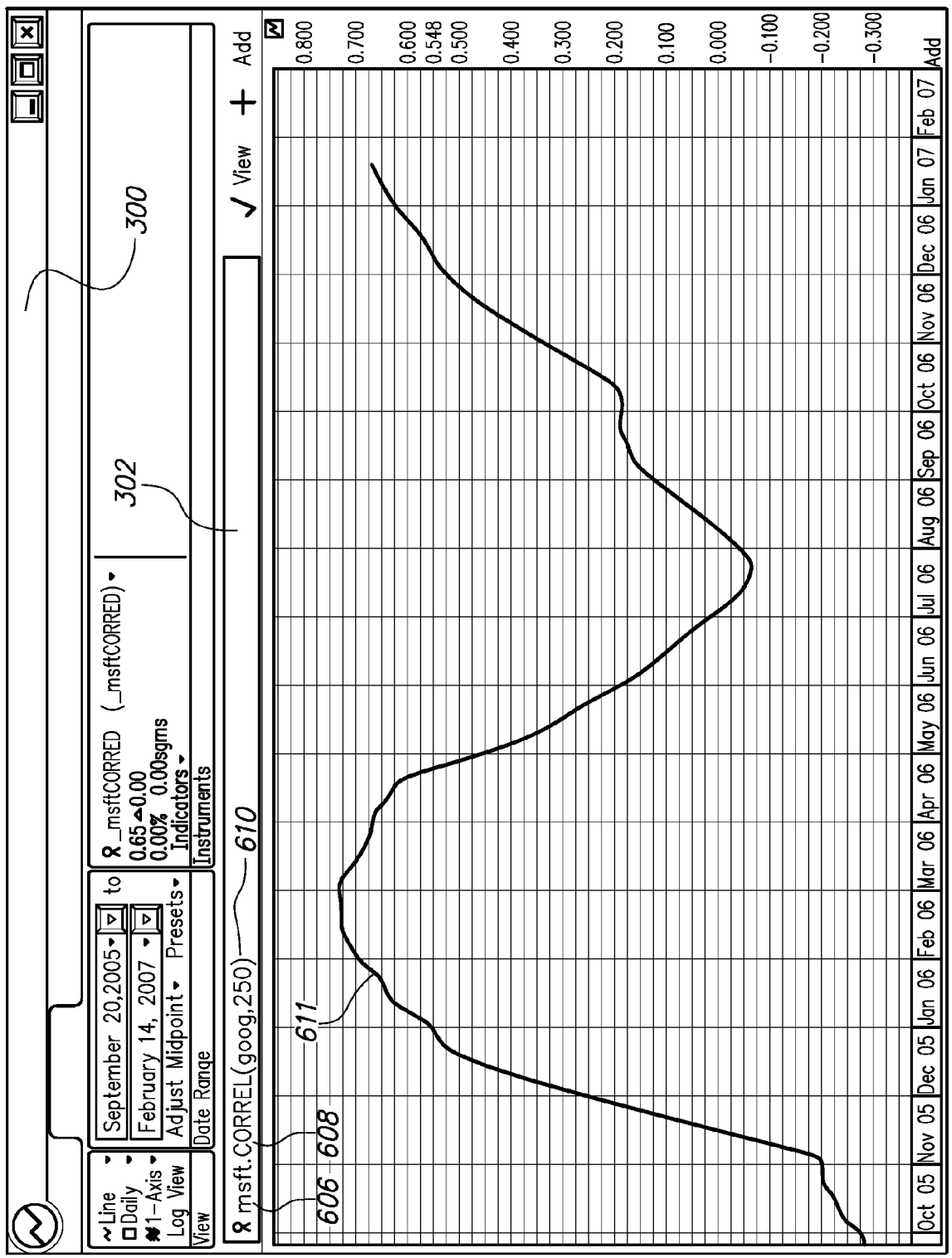
FIG. 6 illustrates an example graphical user interface according to another embodiment.

As an operational example, suppose that a user wants to see a time series of correlation coefficients that are computed between time series of the closing prices of the "MSFT" and "GOOG" stock instruments, where the correlation value on each trading day is derived by correlating the closing prices for the two instruments over the prior one-year period. To accomplish this, in one embodiment the user may specify the following input:

MSFT.CORREL(GOOG, 250)

where the "MSFT" instrument is the caller instrument, the "GOOG" instrument is the callee instrument, and "250" is substantially the number of trading days in a one-year period. FIG. 6 illustrates an example graphical user interface that is configured to receive the above input according to this embodiment.

In the example of FIG. 6, the user enters in GUI component 302 an expression that comprises left-hand side 606 which specifies the identifier of the "MSFT" stock instrument, followed by the period character ".", followed by right-hand side 608 which specifies the "CORREL" method, followed by a right-hand side 610 which specifies the default "CLOSE" method of the "GOOG" instrument and "250" as parameters for the "CORREL" method. After the user enters input requesting that a time series be generated, the expression entered in GUI component 302 is sent to a time series generator, which parses the input and generates a time series. The generated time series includes a sequence of values that are correlation coefficients computed between the time series of the closing price of the "MSFT" instrument and the time series of the closing price of the "GOOG" instrument for each of the past 250 trading days. After the time series generator returns the time series, the logic associated with graphical user interface 300 plots the graphical representation 611 of the generated time series on the chart in the graphical user interface.

Applying Methods in a Chain

According to the techniques described herein, a time series generator may support syntax rules that allow methods specified in user input to be applied to time series generated by other methods specified in the same user input. This chaining of method applications allows a user to generate a time series by specifying an expression that reflects the way the user thinks about market instruments and time series thereof.

Figure 7A:
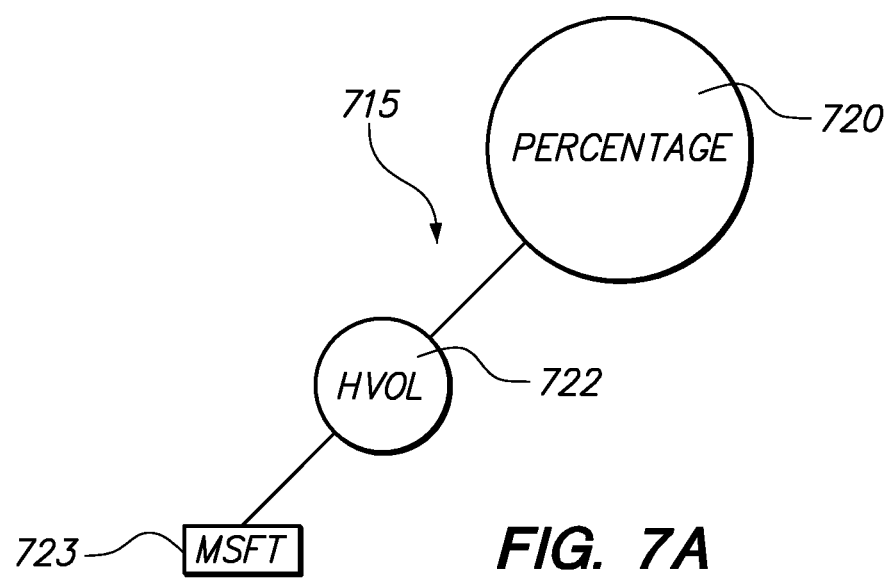
FIG. 7A illustrates a block diagram of a computer-generated tree representing an expression according to one embodiment.

As an operational example, suppose that a user wants to see a time series that includes as values certain percentages of the historical volatility the closing prices of the "MSFT" stock instrument. To accomplish this, in one embodiment the user may specify the following expression:

MSFT.HVOL.PERCENTAGE which indicates that the "PERCENTAGE" method is to be applied to a time series generated by applying the "HVOL" method to the closing price of the "MSFT" instrument. FIG. 7A illustrates a block diagram of a computer-generated tree that represents the above expression. In FIG. 7A, the "PERCENTAGE" method is represented at the root node 720 of in-memory tree 715. Node 722 represents the "HVOL" method as the left sub-tree of root node 720; root node 720 is not associated with a right sub-tree. Node 723 represents the machine representation of the time series of the closing price of the "MSFT" instrument as the left leaf node of node 722; node 722 is not associated with a right leaf node.

Figure 7B:
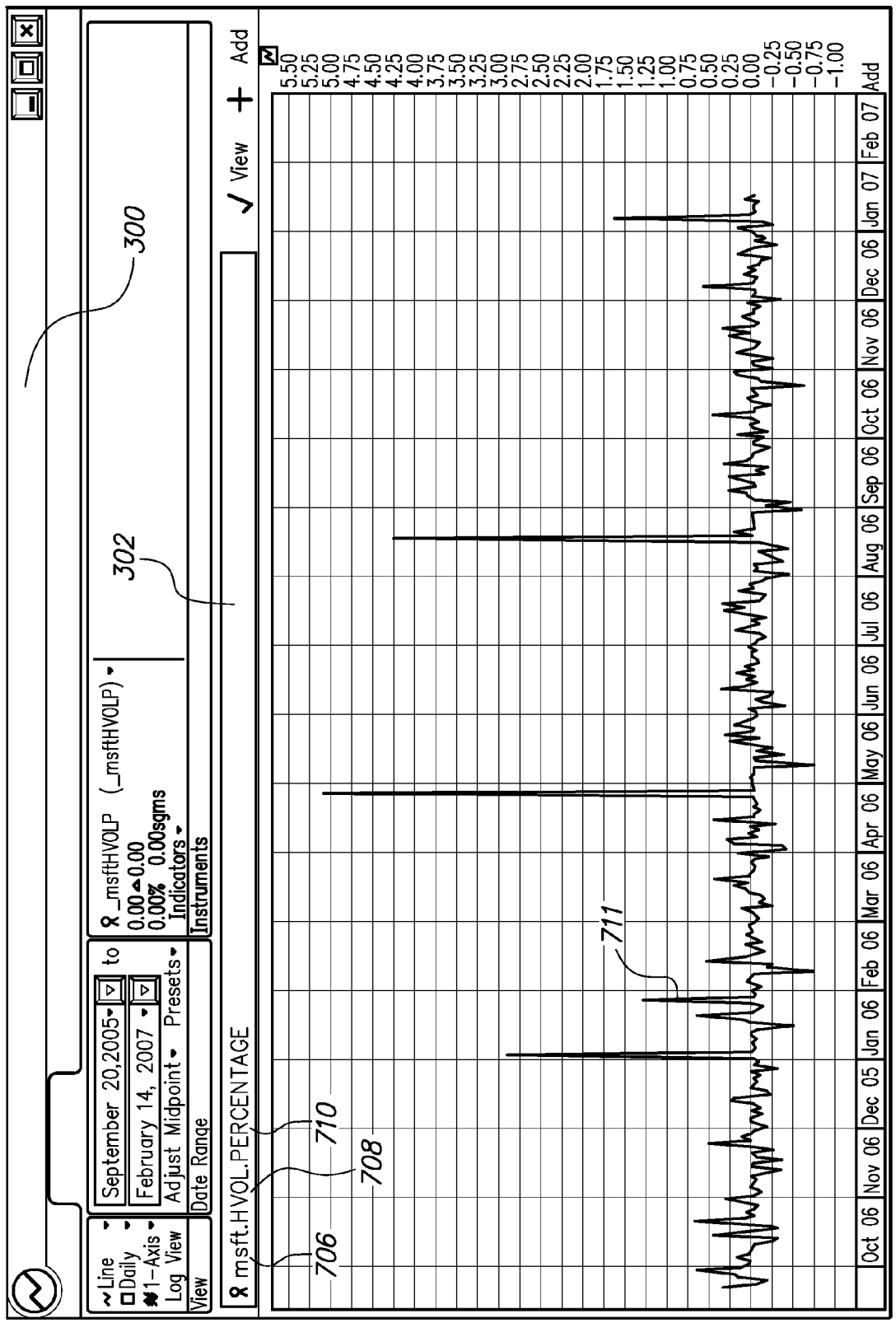
FIG. 7B illustrates an example graphical user interface according to one embodiment.

FIG. 7B illustrates an example graphical user interface that is configured to receive the above expression according to this embodiment. In the example of FIG. 7B, the user enters in GUI component 302 an expression that comprises a left-hand side that includes expressions 706 and 708. Expression 706 specifies the identifier of the "MSFT" stock instrument; the period character "."; and expression 708 which specifies the "HVOL" method. The left-hand side of the expression specified by the user is followed the period character "." and by right-hand side 710 which specifies the "PERCENTAGE" method. After the user enters input requesting that a time series be generated, the expression entered in GUI component 302 is sent to a time series generator. The time series generator parses the received expression according to the precedence specified in the syntax rules provided by the techniques described herein. Based on information generated during the parsing (e.g. an AST of the user-provided expression), the time series generator first generates a time series of the historical volatility of the closing price of the "MSFT" instrument by applying the "HVOL" method to a set of closing price values of the instrument. The time series generator then applies the "PERCENTAGE" method to this generated time series to construct the final time series requested by the user. After the time series generator returns the final time series, the logic associated with graphical user interface 300 plots the graphical representation 711 of the returned time series on the chart in the graphical user interface.

Applying Methods to Time Series Derived by Applying Mathematical Operations

According to the techniques described herein, a time series generator may support syntax rules that allow methods specified in user input to be applied to a time series that is defined in a user-specified expression by using mathematical operations. For example, a user may provide input that specifies an expression in which identifiers of one or more market instruments are joined by the symbols "+", "−", "*", or "/" which indicate that addition, subtraction, multiplication, or division operations, respectively, need to be performed on data sets associated with the one or more market instruments before a method specified in the user input is to be applied to generate a time series.

Figure 8A:
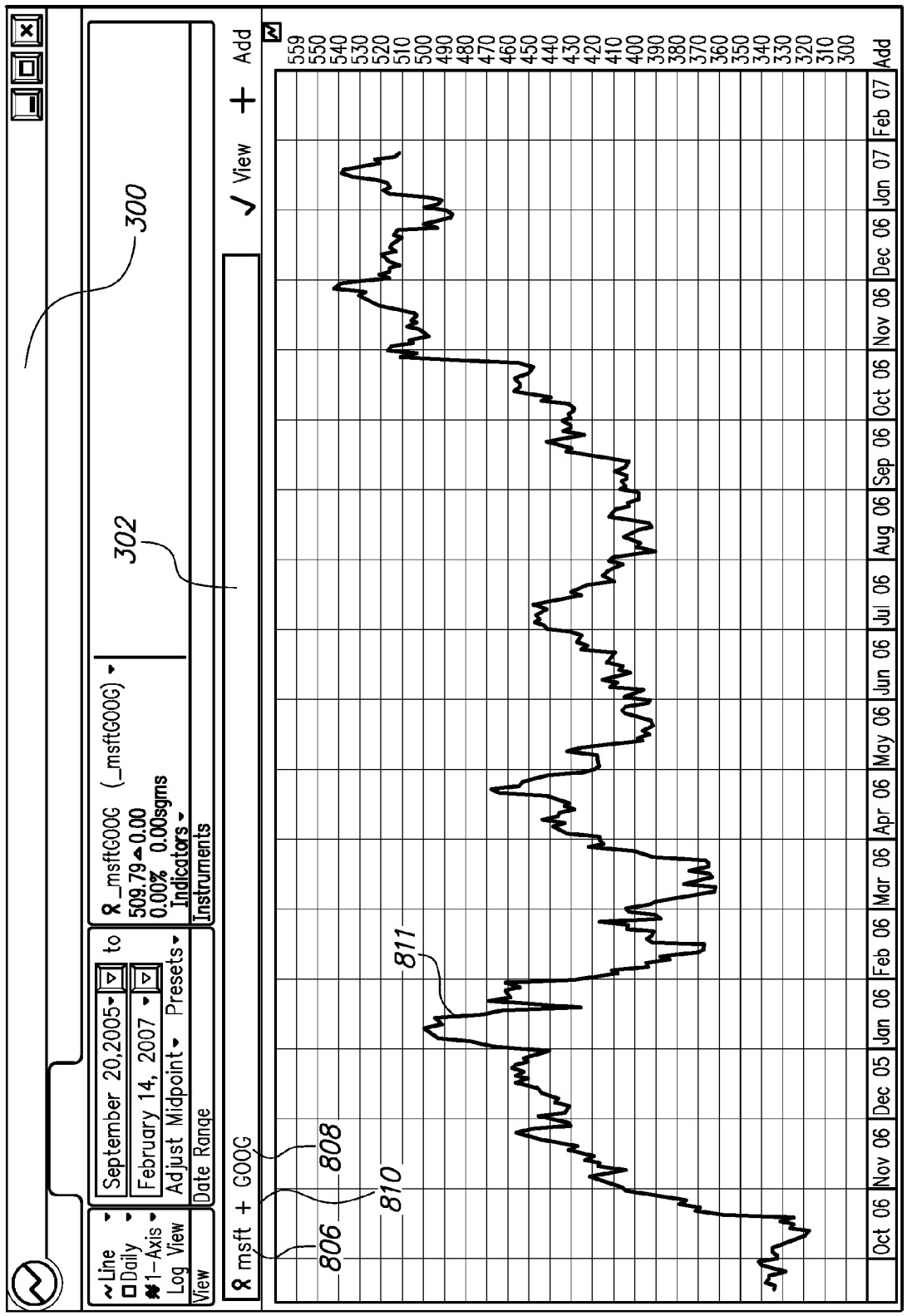
FIGS. 8A and 8B illustrate an example graphical user interface according to another embodiment.

As one operational example, suppose that a user wants to see a time series that includes as values the sums of the closing prices of the "MSFT" and "GOOG" stock instruments for corresponding trading days in a certain time period. To accomplish this, in one embodiment the user may specify the following expression:

MSFT+GOOG which indicates that a time series needs to be constructed by summing the closing prices of the "MSFT" and "GOOG" instruments for certain corresponding trading days. FIG. 8A illustrates an example graphical user interface that is configured to receive the above expression according to this embodiment.

In the example of FIG. 8A, the user enters in GUI component 302 an expression that comprises left-hand side 806 which specifies the identifier of the "MSFT" stock instrument, followed by operation character 810 which indicates an addition operation, followed by left-hand side 808 which specifies the identifier of the "GOOG" instrument. After the user enters input requesting that a time series be generated, the expression entered in GUI component 302 is sent to a time series generator. The time series generator parses the received expression according to the precedence specified in the syntax rules provided by the techniques described herein. Based on information generated during the parsing (e.g. an AST of the user input), the time series generator generates a time series with data values that represent the sums of the closing prices of the "MSFT" and "GOOG" instruments for corresponding trading days. After the time series generator returns the generated time series, the logic associated with graphical user interface 300 plots the graphical representation 811 of the returned time series on the chart in the graphical user interface.

Figure 8B:
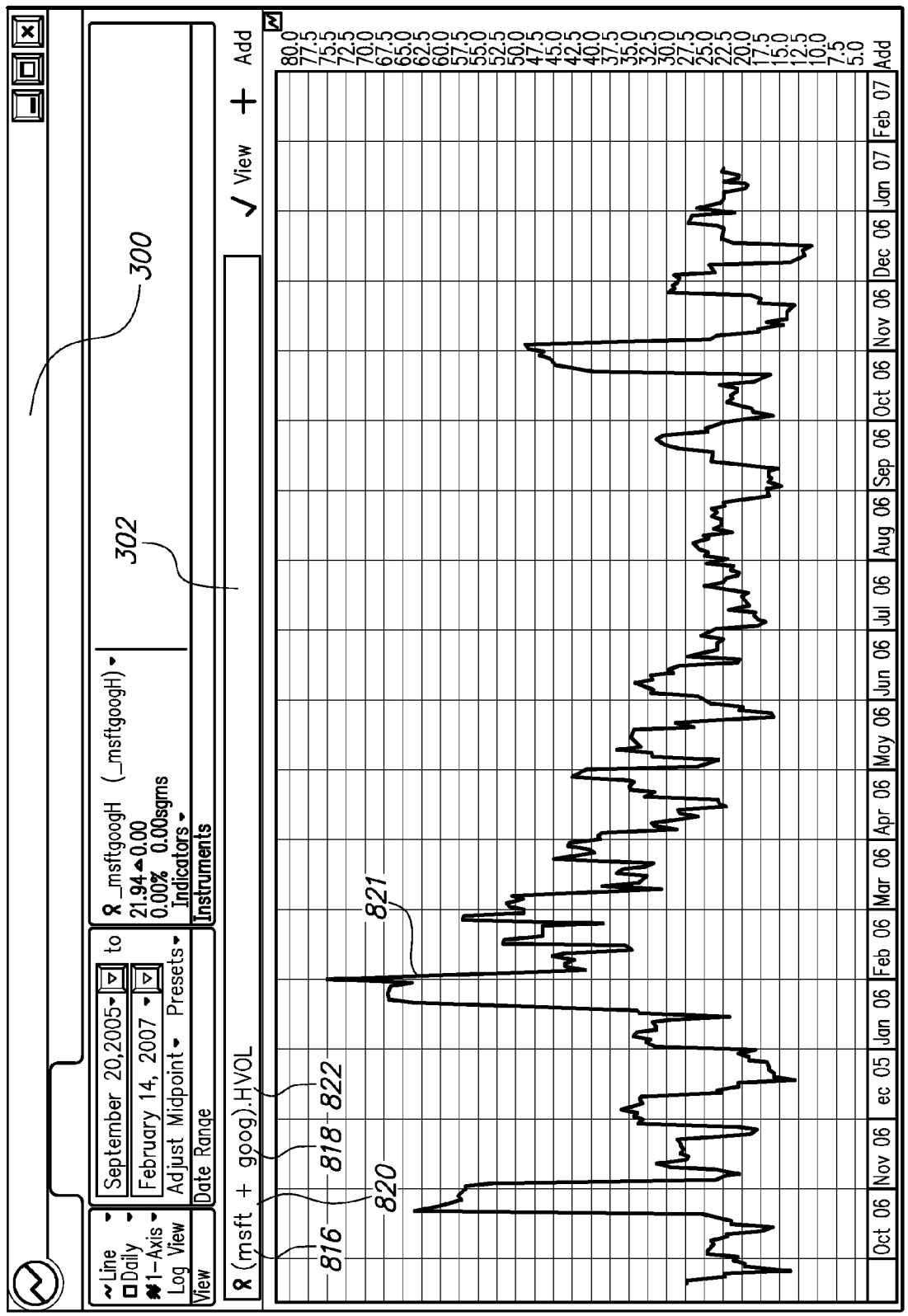

As another operational example, suppose that a user wants to see a time series that includes as values the historical volatility of the sums of the closing prices of the "MSFT" and "GOOG" stock instruments for corresponding trading days in a certain time period. To accomplish this, in one embodiment the user may specify the following expression:

(MSFT+GOOG).HVOL which indicates that the "HVOL" method is to be applied to a set of data values that is constructed by summing the closing prices of the "MSFT" and "GOOG" instruments for certain corresponding trading days. FIG. 8B illustrates an example graphical user interface that is configured to receive the above input according to this embodiment.

In the example of FIG. 8B, the user enters in GUI component 302 an expression that comprises a left parenthesis, followed by left-hand side 816 which specifies the identifier of the "MSFT" stock instrument, followed by operation character 820 which indicates an addition operation, followed by left-hand-side 818 which specifies the identifier of the "GOOG" instrument, followed by a left parenthesis and the period character ".", followed by right-hand side 822 which specifies the identifier of the "HVOL" method. After the user enters input requesting that a time series be generated, the expression entered in GUI component 302 is sent to a time series generator. The time series generator parses the received expression according to the precedence specified in the syntax rules provided by the techniques described herein. Based on information generated during the parsing (e.g. an AST of the user input), the time series generator first generates a set of data values that represents the sums of the closing prices of the "MSFT" and "GOOG" instruments for corresponding trading days. The time series generator then applies the "HVOL" method to this generated time series to construct the final time series requested by the user. The final time series includes values that represent the historical volatility of the sums of the closing prices of the "MSFT" and "GOOG" instruments for corresponding trading days. After the time series generator returns the final time series, the logic associated with graphical user interface 300 plots the graphical representation 821 of the returned time series on the chart in the graphical user interface.

Using Generated Time Series to Perform Market Analysis

According to the techniques described herein, a time series generator may store or cause a generated time series to be stored in computer data storage. Time series generated by a time series generator according to the techniques described herein may be used by various application tools to perform various types of analysis.

For example, in one embodiment time series generated by a time series generator may be used in a regression tool to model the behavior of one dependent time series in terms of the behavior of other independent time series.

In another embodiment, time series may be used in a back test tool to evaluate a trading strategy over a past time period to determine what result would have been obtained if the trading strategy were actually executed during the past time period, where evaluating the trading strategy may involve applying one or more trading actions based on time series associated with one or more market instruments.

In another embodiment, stored time series may be used in a search tool to determine correlations between market instruments, where determining the correlation may be based on comparing features of the market instruments that are reflected in the time series associated with the market instruments.

The use of time series generated according to the techniques described herein is not limited to any particular tool or any particular type of analysis. Thus, the examples of time series usage provided herein are to be regarded in an illustrative rather than a restrictive sense.

VI. Example Implementation Hardware

Figure 9:
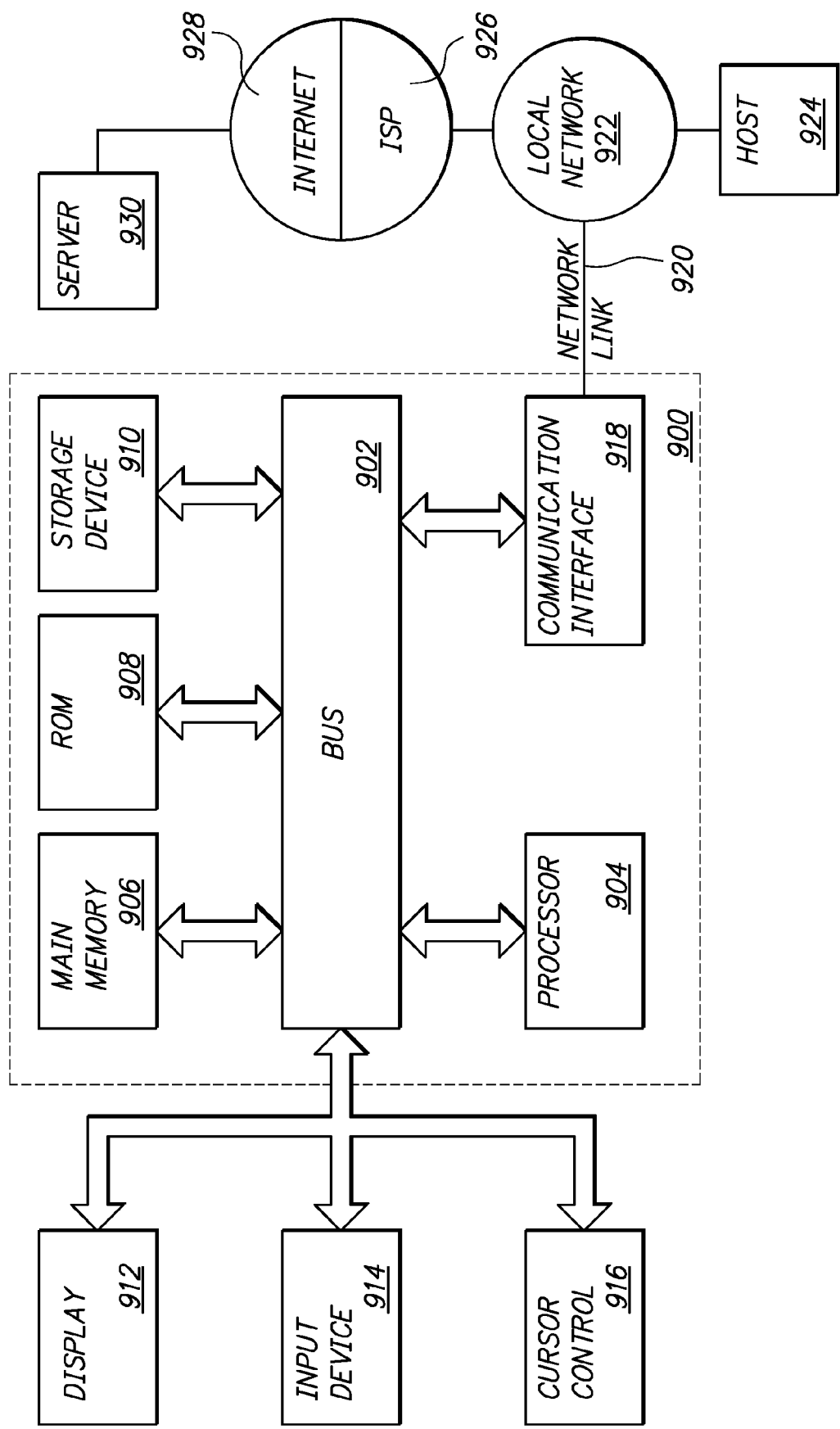
FIG. 9 illustrates a computer system with which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented process comprising the steps of:
    receiving a user-specified expression that comprises a left-hand side and a right-hand side, wherein:
        the left-hand side specifies one or more market instruments; and
        the right-hand side specifies a first method that is to be applied based on the left-hand side of the expression;
        wherein the first method is a set of computer-executable instructions which, when executed, is operable to construct and return time series as output;
    parsing the expression to generate an in-memory representation that identifies the one or more market instruments and the first method;
    based on the in-memory representation, generating a first time series by applying the first method based on one or more sets of data values associated with the one or more market instruments; and
    storing the first time series in computer data storage;
    wherein the steps of the process are performed by one or more computer systems.

2. The process of claim 1, further comprising the step of:
recursively performing the steps of parsing, generating, and storing based on a sub-expression that is included in the left-hand side of the expression.

3. The process of claim 1, wherein
the first time series is a sequence of data values representing the one or more market instruments.

4. The process of claim 1, wherein:
the step of parsing the expression comprises recursively parsing the left-hand side and the right-hand side to generate the in-memory representation; and
the step of generating the first time series comprises, prior to applying the first method, retrieving the one or more sets of data values based on the in-memory representation.

5. The process of claim 1, wherein the step of generating the first time series comprises the steps of:
locating the one or more sets of data values in a data repository based on the left-hand side of the expression; and
retrieving the one or more sets of data values from the data repository.

6. The process of claim 1, wherein the step of generating the first time series comprises the steps of:
locating the one or more sets of data values in a data repository based on the left-hand side of the expression;
retrieving the one or more sets of data values from the data repository;
performing one or more mathematical computations on the one or more sets of data values to generate intermediate information; and
applying the first method to the intermediate information.

7. The process of claim 1, wherein the right-hand side specifies one or more parameters for the first method, wherein the one or more parameters comprise any one of:
an identifier of a particular market instrument; and
an identifier of a particular time series associated with a particular market instrument.

8. The process of claim 1, wherein:
the left-hand side of the expression comprises a sub-expression, wherein the sub-expression comprises a second method which, when evaluated, returns a second time series; and
the step of generating the first time series comprises the steps of:
applying the second method to the one or more sets of data values to generate the second time series; and
applying the first method to the second time series.

9. The process of claim 1, wherein:
the left-hand side of the expression specifies one or more mathematical operations involving at least one of the one or more market instruments; and
the step of generating the first time series comprises the steps of:
based on at least one of the one or more sets of data values, performing the one or more mathematical operations to generate intermediate information; and
applying the first method to the intermediate information.

10. A computer-implemented process comprising the steps of:
receiving user input that includes an expression comprising a left-hand side and a right-hand side, wherein:
the left-hand side specifies one or more market instruments; and
the right-hand side specifies a first method that is to be applied based on the left-hand side of the expression;
wherein the first method is a set of computer-executable instructions which, when executed, is operable to construct and return time series as output;
sending a request to generate a first time series, wherein the request includes first information based on the left-hand side and the right-hand side of the expression;
wherein the first information identifies the one or more market instruments and the first method;
in response to the request, receiving the first time series which is generated based on the first information by applying the first method based on one or more sets of data values associated with the one or more market instruments; and
displaying a graphical representation of the first time series in a graphical user interface;
wherein the steps of the process are performed by one or more computer systems.

11. The process of claim 10, further comprising:
recursively parsing at least one of the left-hand side and the right-hand side to generate the first information;
wherein the step of receiving the user input comprises the steps of:
receiving the left-hand side of the expression; and
based on the left-hand side, automatically determining a default method as the first method in the right-hand side of the expression.

12. A non-transitory machine-readable storage medium comprising one or more program instructions recorded thereon, which instructions, when executed by one or more processors, cause the one or more processors to perform the steps of:
receiving a user-specified expression that comprises a left-hand side and a right-hand side, wherein:
the left-hand side specifies one or more market instruments; and
the right-hand side specifies a first method that is to be applied based on the left-hand side of the expression;
wherein the first method is a set of computer-executable instructions which, when executed, is operable to construct and return time series as output;
parsing the expression to generate an in-memory representation that identifies the one or more market instruments and the first method;
based on the in-memory representation, generating a first time series by applying the first method based on one or more sets of data values associated with the one or more market instruments; and
storing the first time series in computer data storage.

13. The machine-readable medium of claim 12, wherein the one or more program instructions further comprise instructions which, when executed by the one or more processors, cause the one or more processors to perform the step of:
recursively performing the steps of parsing, generating, and storing based on a sub-expression that is included in the left-hand side of the expression.

14. The machine-readable medium of claim 12, wherein the first time series is a sequence of data values representing the one or more market instruments.

15. The machine-readable medium of claim 12, wherein:
the instructions that cause the one or more processors to perform the step of parsing the expression further comprise instructions which, when executed by the one or more processors, cause the one or more processors to perform the step of recursively parsing the left-hand side and the right-hand side to generate the in-memory representation; and the instructions that cause the one or more processors to perform the step of generating the first time series further comprise instructions which, when executed by the one or more processors, cause the one or more processors to perform the step of, prior to applying the first method, retrieving the one or more sets of data values based on the in-memory representation.

16. The machine-readable medium of claim 12, wherein the instructions that cause the one or more processors to perform the step of generating the first time series further comprise instructions which, when executed by the one or more processors, cause the one or more processors to perform the steps of:
    locating the one or more sets of data values in a data repository based on the left-hand side of the expression; and
    retrieving the one or more sets of data values from the data repository.

17. The machine-readable medium of claim 12, wherein the instructions that cause the one or more processors to perform the step of generating the first time series further comprise instructions which, when executed by the one or more processors, cause the one or more processors to perform the steps of:
    locating the one or more sets of data values in a data repository based on the left-hand side of the expression;
    retrieving the one or more sets of data values from the data repository;
    performing one or more mathematical computations on the one or more sets of data values to generate intermediate information; and
    applying the first method to the intermediate information.

18. The machine-readable medium of claim 12, wherein the right-hand side of the expression specifies one or more parameters for the first method, wherein the one or more parameters comprise any one of:
    an identifier of a particular market instrument; and
    an identifier of a particular time series associated with a particular market instrument.

19. The machine-readable medium of claim 12, wherein:
    the left-hand side of the expression comprises a sub-expression, wherein the sub-expression comprises a second method which, when evaluated, returns a second time series; and
    the instructions that cause the one or more processors to perform the step of generating the first time series further comprise instructions which, when executed by the one or more processors, cause the one or more processors to perform the steps of:
        applying the second method to the one or more sets of data values to generate the second time series; and
        applying the first method to the second time series.

20. The machine-readable medium of claim 12, wherein:
    the left-hand side of the expression specifies one or more mathematical operations involving at least one of the one or more market instruments; and
    the instructions that cause the one or more processors to perform the step of generating the first time series further comprise instructions which, when executed by the one or more processors, cause the one or more processors to perform the steps of:
        based on at least one of the one or more sets of data values, performing the one or more mathematical operations to generate intermediate information; and
        applying the first method to the intermediate information.

21. A non-transitory machine-readable storage medium comprising one or more program instructions recorded thereon, which instructions, when executed by one or more processors, cause the one or more processors to perform the steps of:
    receiving user input that includes an expression comprising a left-hand side and a right-hand side, wherein:
        the left-hand side specifies one or more market instruments; and
        the right-hand side specifies a first method that is to be applied based on the left-hand side of the expression;
        wherein the first method is a set of computer-executable instructions which, when executed, is operable to construct and return time series as output;
    sending a request to generate a first time series, wherein the request includes first information based on the left-hand side and the right-hand side of the expression;
    wherein the first information identifies the one or more market instruments and the first method;
    in response to the request, receiving the first time series which is generated based on the first information by applying the first method based on one or more sets of data values associated with the one or more market instruments; and
    displaying a graphical representation of the first time series in a graphical user interface.

22. The machine-readable medium of claim 21, wherein:
    the one or more program instructions further comprise instructions which, when executed by the one or more processors cause the one or more processors to perform the step of recursively parsing at least one of the left-hand side and the right-hand side to generate the first information; and
    the instructions that cause the one or more processors to perform the step of receiving the user input further comprise instructions which, when executed by the one or more processors, cause the one or more processors to perform the steps of:
        receiving the left-hand side of the expression; and
        based on the left-hand side, automatically determining a default method as the first method in the right-hand side of the expression.

* * * * *